UNITED STATES PATENT OFFICE.

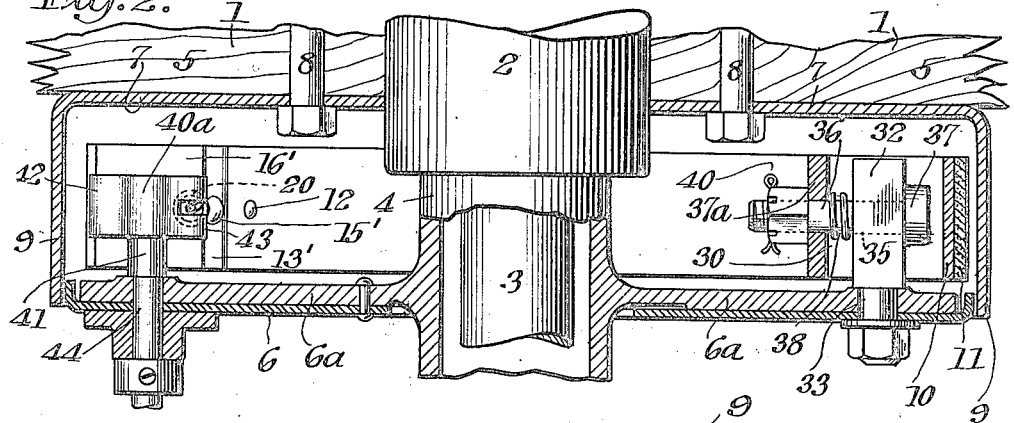
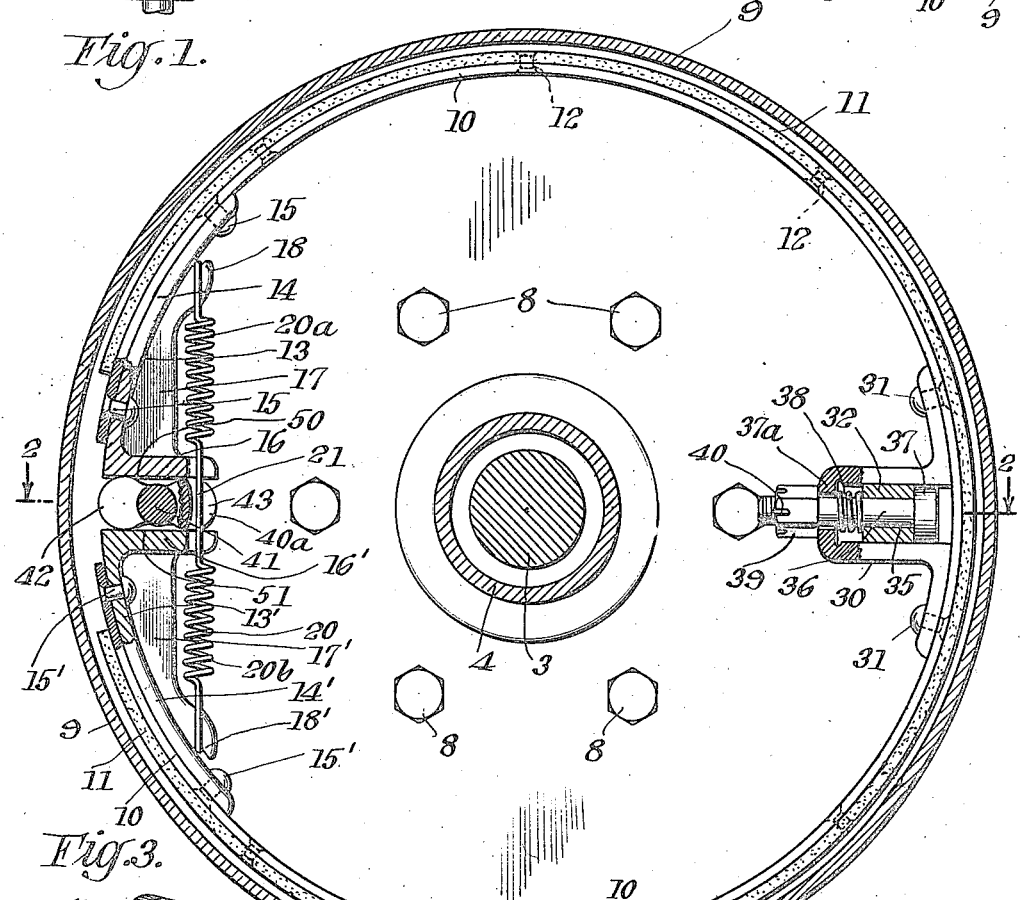
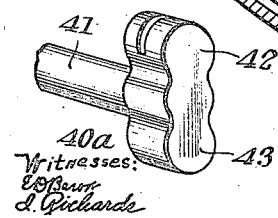

ARTHUR C. MASON, OF FLINT, MICHIGAN, ASSIGNOR, BY MESNE ASSIGNMENTS, TO CHEVROLET MOTOR COMPANY, A CORPORATION OF DELAWARE.

AUTOMOBILE WHEEL-BRAKE.

1,301,956. Specification of Letters Patent. Patented Apr. 29, 1919.

Application filed September 9, 1915. Serial No. 49,664.

*To all whom it may concern:*

Be it known that I, ARTHUR C. MASON, a citizen of the United States, and a resident of the city of Flint, county of Genesee, and State of Michigan, have invented certain new and useful Improvements in Automobile Wheel-Brakes, of which the following is a specification.

The invention relates to a brake band for use in automobile construction, so arranged that the movable braking element engages with the entire inner surface of the brake drum.

One of the objects of the invention is to provide an improved spring brake element which can be expanded and at the same time shifted bodily to engage its entire outer surface with the inner surface of the brake drum so constructed that it can be adjusted to compensate for wear.

Another object is to make the brake simple in construction, efficient in operation and inexpensive to manufacture.

Other objects will appear from the following description and claims.

Referring to the drawing:

Figure 1 is a side elevation of the braking element shown in its normal and inoperative position, the brake flange, shaft and shaft housing being shown in section, portions of the coöperating elements being partly broken away and shown in section.

Fig. 2 is a section on the staggered line 2—2 of Fig. 1, with portions of the coöperating elements shown in plan.

Fig. 3 is a perspective view of the cam element.

In the drawings, like reference characters refer to like parts.

1 is a portion of a wheel, 2 indicates the wheel hub, 3 the shaft, 4 the shaft housing and 5 the spokes of the wheel. 6 is a plate secured by any suitable means to the spider arm $6^a$, which are integral with the shaft housing, 7 the brake drum, 8 means for securing the brake drum to the wheel. 10 is a circular split spring element situated within the brake drum and so arranged that its upper surface is contiguous to the inner surface of the flange 9 of the brake drum and 11 is the brake lining made of any suitable material adapted for that purpose and secured by any suitable means as 12 to the outer surface of the spring split ring 10. To each free end of the split spring upon the inner surfaces thereof are secured L-shaped castings 13 and 13′, the arms of which 14 and 14′ are curved to fit closely upon the inner surface of the spring and are secured by suitable means 15 and 15′ to the said spring. The other arms 16 and 16′ of the L-shaped casting project inwardly toward the center on lines substantially parallel to each other and each of these castings is provided with centrally arranged strengthening ribs 17 and 17′. The outer ends of said ribs are provided with notches 18 and 18′ as shown. A spring 20 is secured at each end to the notches 18 and 18′ in the ribs 17 and 17′. This spring is provided with helical portions $20^a$ and $20^b$ near each end, the inner ends of the helical portions being connected by a straight integral piece 21. The inner arms 16 and 16′ of the L-shaped castings 13 and 13′ are provided with kerfs or notches in the ends thereof through which passes the straight portion 21 connecting the spring elements. At the inner surface of the split spring ring at the central portion thereof, opposite the split in the ring, is secured the U-shaped element 30 by any suitable means as 31. A block 32 is secured by a nut or any suitable means to a spider arm $6^a$ of the axle housing at 33. This block is substantially square in cross section and fits nicely within the walls of the U-shaped element 30 and it is of sufficient width to permit a substantial movement of the U-shaped element upon it. Through the block is a radial hole or opening 35 in which is closely fitted a bolt 36 having a head 37 which abuts against the outer sides of the block 32. Surrounding the shank of the bolt between the bridge $37^a$ of the U-shaped element and the inner surface of the block, is a compression spring 38 which normally tends to hold the split spring braking element away from the surface of the brake flange. The end of the bolt passes through an opening in the bridge $37^a$ of the U-shaped element and a nut 39 is provided with means 40 for locking it in its adjusted position on the end of the bolt. In practice, this nut is so positioned on the bolt that the outer surface of the bridge of the U-shaped element will be forced against it by the operation of the spring 38. A cam $40^a$, consisting of a cam shaft 41, cam elements 42 and 43 which coöperate with the spring, is pivotally supported at 44 on the spider $6^a$ of the shaft housing, and it is so positioned that it may be turned in its bearing upon its axis by operating any suitable lever or means which are arranged in such a position as to be easily operated by the chauffeur. The cam elements 42 and 43 normally rest within the shorter arms 16 and 16' of the L-shaped castings 13 and 13' and in the inner cam element 43 is cut or formed a kerf or slot which is in juxtaposition with the kerfs or slots in the inner arms of the L-shaped casting and through which passes the straight portion 21 connecting the spring portion $20^a$ and $20^b$ of the spring 20.

The operation of my improved brake is as follows:

When the cam is turned on its axis, the arms thereof operate against the inner surfaces 50 and 51 of the L-shaped castings and the free ends of the split circular spring will then be forced apart thereby causing them to impinge against the inner surface of the brake drum. When the braking surface of the spring is thus forced against the inner surface of the brake drum, a cam action sets in and the entire spring is then shoved over in the direction of the arrow A against the action of the spring 38 surrounding the shank of the bolt 36. The spring braking element is thus caused to engage throughout its entire surface with the entire surface of the flanges of brake drum.

When the braking operation is completed, the chauffeur then releases the cam element 40 and it then takes its normal position as shown in Fig. 1 and the split spring braking element resumes its normal position by the combined operations of the springs.

When the brake lining 11 becomes worn, an adjustment of its position is made by means of the lock nut 39, which may be set in any suitable position on the shank of the bolt 36, to accomplish this purpose.

While I have shown certain features of my invention in the accompanying drawings, it is to be understood that said drawings are merely illustrative, and that I am not confined to what is there shown and herein described, in connection therewith, except as may be specifically set forth in the claims.

Having now described my invention, what I claim as new and desire to secure by Letters Patent, is:—

1. In an automobile brake, a split spring braking element, a cam, one arm of which is provided with a slot, means secured to the free ends of the split spring braking element for engagement with the cam, a spring element, one portion of which passes through the slot in the cam for holding the free ends of the split braking element in engagement with the cam, a U-shaped element arranged opposite to the split in the spring braking element, means engaging with the inner surface of the U-shaped element for supporting the spring braking element, and means for moving the spring braking element radially.

2. In an automobile brake, a spring braking element, means for supporting said braking element, means for causing said braking element to slide upon its supporting means, and a bolt freely mounted on said supporting means and freely engaging with the braking element, and an adjustable means on said bolt to regulate the extent of the sliding movement of the spring braking element, a compression spring encircling the bolt between the said supporting means and the braking element to normally hold the braking element in inactive position.

In witness whereof I have hereunto set my hand at the borough of Manhattan, city and State of New York, this third day of September, 1915.

ARTHUR C. MASON.

In presence of—
ETHEL D. BARON,
JOHN J. RANAGAN.